US012531429B2

(12) United States Patent
Sugatapala et al.

(10) Patent No.: US 12,531,429 B2
(45) Date of Patent: Jan. 20, 2026

(54) BATTERY MANAGEMENT SYSTEM FOR CONVERTING A HIGH VOLTAGE BATTERY BACK TO LOW VOLTAGE OUTPUT

(71) Applicant: Rivian IP Holdings, LLC, Irvine, CA (US)

(72) Inventors: Sanjeewa Keven Sugatapala, Long Beach, CA (US); Baojin Wang, San Marcos, CA (US); Kyle Lobo, Westchester, CA (US); Todd Adams Putnam, Mammoth Lakes, CA (US); Ajay Kumar, Phoenix, AZ (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/762,496

(22) Filed: Jul. 2, 2024

(65) Prior Publication Data

US 2025/0112484 A1 Apr. 3, 2025

Related U.S. Application Data

(60) Provisional application No. 63/587,063, filed on Sep. 29, 2023.

(51) Int. Cl.
*H02J 7/00* (2006.01)
*B60L 50/60* (2019.01)

(52) U.S. Cl.
CPC ............. *H02J 7/007* (2013.01); *B60L 50/60* (2019.02); *B60L 2210/12* (2013.01); *H02J 2207/20* (2020.01); *H02J 2310/48* (2020.01)

(58) Field of Classification Search
CPC ................................. H02J 7/007; B60L 50/06
USPC .......................... 320/103, 104, 112, 137, 138
See application file for complete search history.

(56) References Cited

U.S. PATENT DOCUMENTS

| | | | |
|---|---|---|---|
| 6,700,795 B1 | 3/2004 | Jones et al. | |
| 6,930,404 B1 | 8/2005 | Gale et al. | |
| 8,618,771 B2* | 12/2013 | Ichikawa | ................ B60L 53/22 320/109 |
| 9,496,730 B2 | 11/2016 | Gallegos et al. | |
| 2020/0274375 A1* | 8/2020 | Griffiths | ................... H02J 7/24 |
| 2022/0131398 A1* | 4/2022 | Herranz | .............. H02J 7/00032 |
| 2022/0332206 A1 | 10/2022 | Murthy-Bellur | |
| 2023/0031460 A1 | 2/2023 | Taniguchi | |
| 2023/0120402 A1 | 4/2023 | Juang | |
| 2023/0271512 A1 | 8/2023 | Ashraf | |
| 2023/0365012 A1 | 11/2023 | Namuduri | |

* cited by examiner

*Primary Examiner* — Richard V Muralidar
(74) *Attorney, Agent, or Firm* — BAKERHOSTETLER

(57) ABSTRACT

An apparatus may include a DC to DC converter that converts a high voltage level from a battery pack to a relatively lower voltage level for various components of a vehicle. The DC to DC converter may provide an alternate power supply in addition to a battery that is separate from the battery pack. The battery pack and the DC to DC converter may be used to supply power, instead of the battery, during a sleep mode of a vehicle. Further, the DC to DC converter can supply power to float charge the battery, thus minimizing cycling of the battery. The DC to DC converter and the battery may provide a redundant, or backup, power source for a vehicle.

20 Claims, 12 Drawing Sheets

BATTERY MANAGEMENT SYSTEM FOR CONVERTING A HIGH VOLTAGE BATTERY BACK TO LOW VOLTAGE OUTPUT

CROSS REFERENCED TO RELATED APPLICATION(S)

This application claims the benefit of U.S. Provisional Application No. 63/587,063 entitled "BATTERY MANAGEMENT SYSTEM FOR CONVERTING A HIGH VOLTAGE BATTERY BACK TO LOW VOLTAGE OUTPUT," filed Sep. 29, 2023, the entirety of which is incorporated herein by reference.

INTRODUCTION

Batteries are often used as a source of power, including as a source of power for electric vehicles that include wheels that are driven by an electric motor that receives power from the batteries. A battery may include several battery cells carried within a module and/or a carrier.

SUMMARY

The subject technology is directed to vehicles with a battery management system that integrates a converter (e.g., direct circuit (DC) to DC converter) to convert voltage from an energy storage system and provide the converted voltage to components of the vehicle. For example, the DC to DC converter may step down a high voltage battery pack (of the energy storage system) from a high voltage to a low voltage, and the low voltage may be used to power one or more components in a vehicle. As a result, the DC to DC converter may be used as an alternative power supply in addition to a low voltage power supply (e.g., a battery separate from the battery pack) in the vehicle. Further, the DC to DC converter can use the converted low voltage to float charge the battery.

Aspects of the subject technology can help to reduce cycling (e.g., charging and discharging) of the low voltage battery based in part on float charging capabilities of the DC to DC converter, which can extend the battery life and mitigate climate change by reducing greenhouse gas emissions.

In one or more aspects of the present disclosure, an apparatus is described. The apparatus may include a battery management system configured to provide a first voltage, using an energy storage system, to a propulsion component and a second voltage, using a voltage system separate from the energy storage system, to an electrical component in a first mode. The battery management system is further configured to provide the second voltage, using the energy storage system and a direct current (DC) to DC converter, to the electrical component in a second mode, wherein the second voltage is lower than the first voltage.

The DC to DC converter may be configured to, in the second mode, reduce the first voltage to the second voltage. The energy storage system may include a battery pack, and the voltage system may include a battery. The DC to DC converter may be further configured to float charge the battery in the second mode. The first mode may include a drive mode of a vehicle, and the second mode may include a sleep mode of the vehicle.

The apparatus may further include a bi-directional switch. The apparatus may further include a controller configured to, in the first mode, control the bi-directional switch to permit the voltage system to provide the second voltage to the battery management system.

The apparatus may further include a switch separate from the bi-directional switch. The controller may be configured to, in the second mode, close the switch to permit the DC to DC converter to provide the second voltage to the battery management system.

In one or more aspects of the present disclosure, a vehicle is described. The vehicle may include an energy storage system configured to provide a first voltage. The vehicle may further include a direct current (DC) to DC converter. The vehicle may further include a battery management system configured to provide, using the energy storage system, the first voltage to a propulsion component. The battery management system may further be configured to provide, using the energy storage system and the DC to DC converter, a second voltage to an electrical component and not to the propulsion component.

The battery management system may be configured to: in a drive mode, provide the first voltage to the propulsion component, and in a sleep mode, provide the second voltage to the electrical component.

The vehicle may further include a voltage system. The battery management system may be further configured to, in the drive mode, provide, using the voltage system, the second voltage. The battery management system may be further configured to, in response to a loss of power from the voltage system, use the energy storage system and the DC to DC converter to provide the second voltage.

The vehicle may further include a conductive pathway electrically coupled to the DC to DC converter, the battery management system and the voltage system. In the drive mode, the voltage system provides, via the conductive pathway, the second voltage to the battery management system, and in the sleep mode, the DC to DC converter provides, via the conductive pathway, a float charge to a battery of the voltage system. In the drive mode, the DC to DC converter may be in an active state and may be configured to provide the first voltage and the second voltage, and in the sleep mode, the battery may be in an inactive state.

The vehicle may further include a bi-directional switch. The vehicle may further include a controller configured to, in the drive mode, control the bi-directional switch to permit the voltage system to provide the second voltage to the battery management system.

The vehicle may further include a switch, wherein in the sleep mode. The controller may be configured to close the switch to permit the DC to DC converter to provide the second voltage to the battery management system. The first voltage may include an unswitched voltage configured to provide the first voltage, and the DC to DC converter may be configured to reduce the unswitched voltage to the second voltage in the sleep mode.

In one or more aspects of the present disclosure, a method is described. The method may include providing, from an energy storage system, a first voltage to a propulsion component of an apparatus while the apparatus may be in a first mode. The method may further include providing, from the energy storage system, a second voltage to an electrical component of the apparatus while the apparatus may be in a second mode, wherein the second voltage may be lower than the first voltage. Providing the second voltage may include, providing, from a direct current (DC) to DC converter, the second voltage.

The method may further include, in the first mode, providing the second voltage from a battery separate from the energy storage system. The method may further include, in the second mode, float charging, using the DC to DC converter, the battery.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Aspects of the subject technology described herein relate to an apparatus that may be integrated into a vehicle to provide an additional or redundant power supply. The apparatus may include a DC to DC converter designed to convert a high voltage from a battery pack (in an energy storage system) to a low voltage. The low voltage may be suitable for supplying power (in the form of a voltage level and electrical current) to various components of the vehicle, such as power seats and lights, as non-limiting examples. The DC to DC converter may function as an alternate low voltage power supply. For example, the vehicle may include a battery (e.g., low voltage battery) used to power the components while the vehicle is in a particular mode (e.g., a drive mode). However, when the vehicle transitions a different mode (e.g., a sleep mode), the DC to DC converter may power the vehicle components, as opposed to the low voltage battery. Moreover, the DC to DC converter can float charge the low voltage battery to reduce battery cycling and extend the life of the battery. In this regard, the energy storage system and the DC to DC converter may be designed for "always on" use such that the energy storage system (including the battery pack) and the DC to DC converter are available for use regardless of the mode of the vehicle.

Figure 1A:
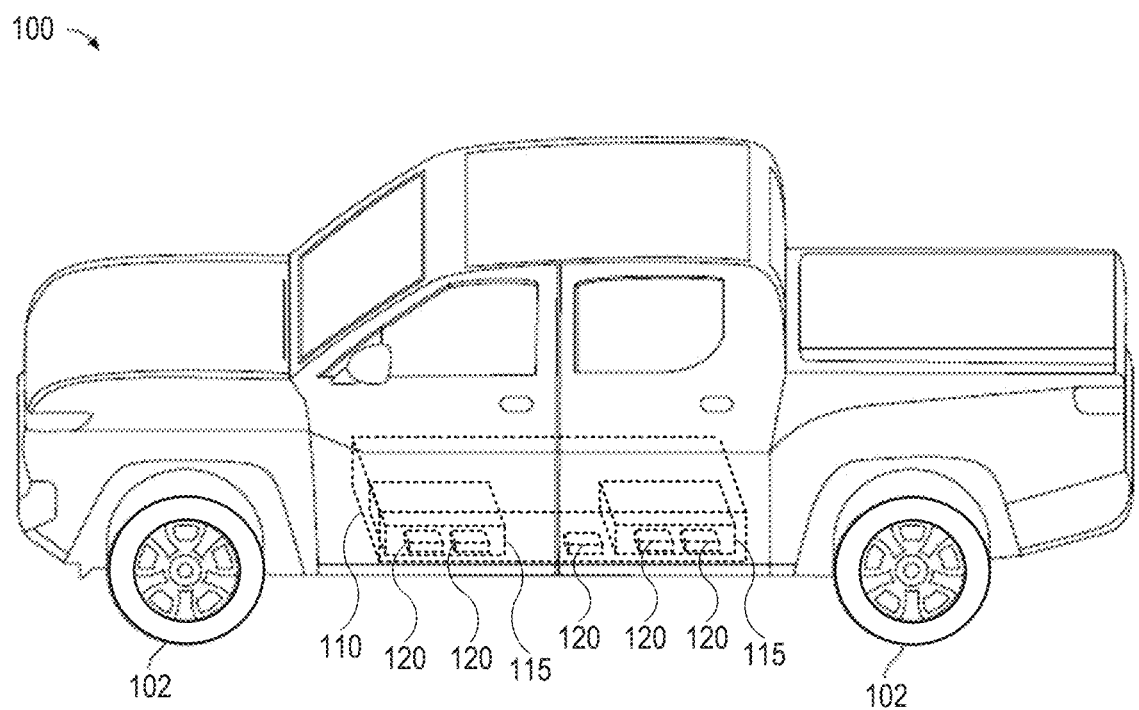
FIG. 1A and FIG. 1B illustrate schematic perspective side views of example implementations of a vehicle having a battery pack, in accordance with one or more implementations of the present disclosure.

FIG. 1A illustrates an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle 100 using electric power from the battery pack 110. In one or more implementations, the vehicle 100 may also, or alternatively, include one or more propulsion components including chemically-powered engines, such as a gas-powered engine or a fuel cell powered motor. For example, in one or more implementations, the vehicle 100 may one or more propulsion components that take the form of a fully electric or partially electric (e.g., hybrid or plug-in hybrid) vehicle.

In the example of FIG. 1A, the vehicle 100 is implemented as a truck (e.g., a pickup truck) having a battery pack 110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without the battery modules 115 and with the battery cells 120 mounted directly in the battery pack 110 (e.g., in a cell-to-pack configuration) and/or in other battery units that are installed in the battery pack 110. The battery pack 110 may include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

Each of the battery cells 120 may be included a battery, a battery unit, a battery module and/or a battery pack to power components of the vehicle 100. For example, a battery cell housing of the battery cells 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle). The power stage circuit can be provided as part of the battery pack 110 or separately from the battery pack 110 within the vehicle 100.

Figure 1B:
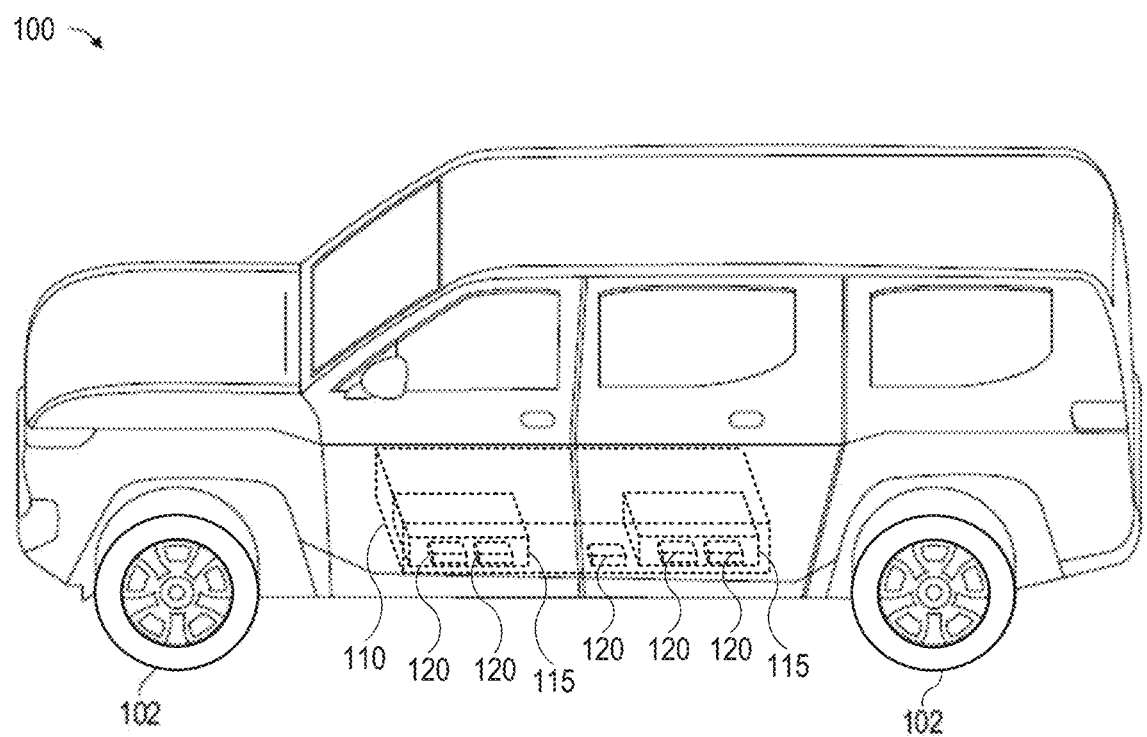

FIG. 1B illustrates another implementation in which the vehicle 100 is implemented as a sport utility vehicle (SUV), such as an electric sport utility vehicle. In the example of FIG. 1B, the vehicle 100 may include a cargo storage area that is enclosed within the vehicle 100 (e.g., behind a row of seats within a cabin of the vehicle 100). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
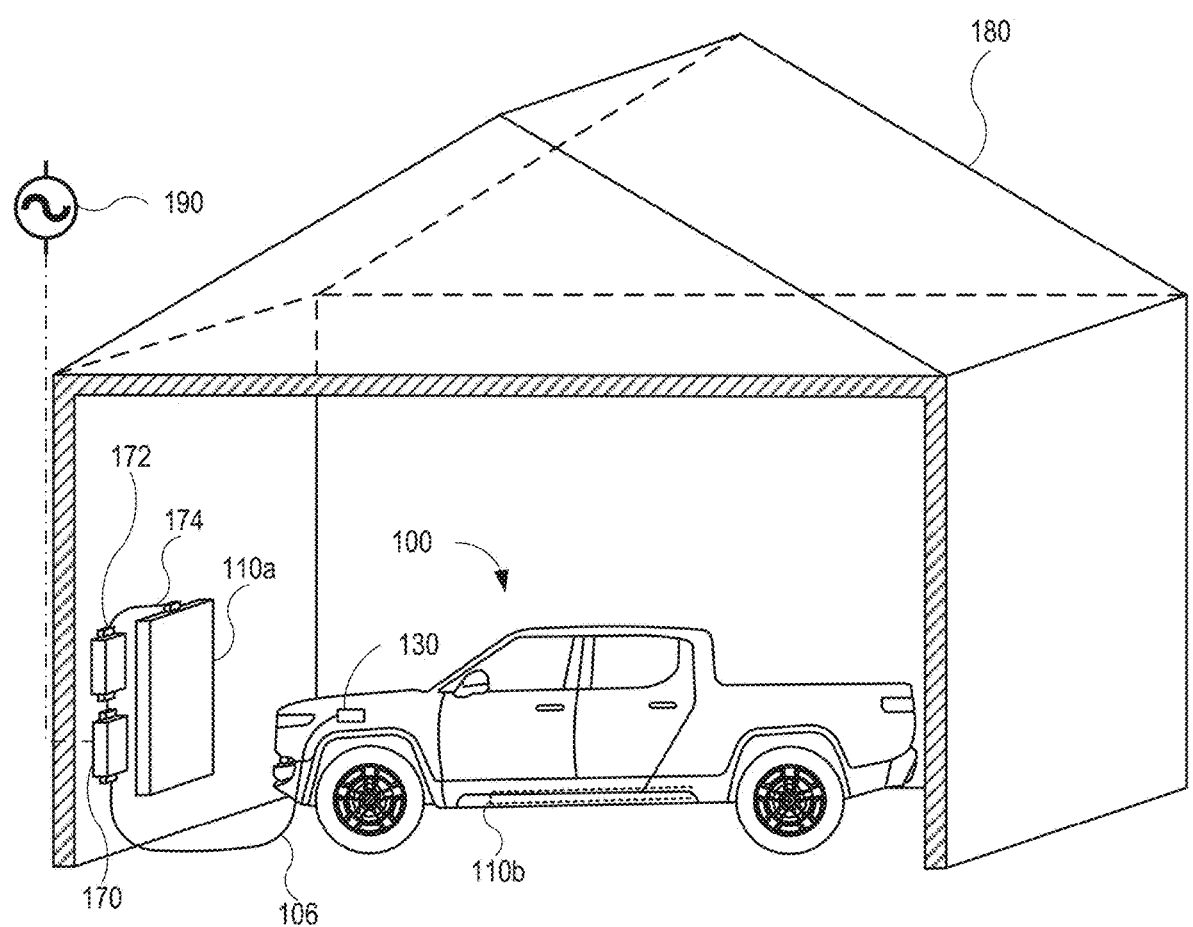
FIG. 1C illustrates a schematic perspective view of a building having a battery pack, in accordance with one or more implementations of the present disclosure.

In one or more implementations, the battery pack 110, battery modules 115, battery cells 120, and/or any other battery unit as described herein may also, or alternatively, be implemented as an electrical power supply and/or energy storage system in a building, such as a residential home or commercial building. For example, FIG. 1C illustrates an example in which a battery pack 110a is implemented in a building 180. The building 180 may be a residential building, a commercial building, or any other building. As shown, in one or more implementations, the battery pack 110a may be mounted to a wall of the building 180.

As shown, the battery pack 110a that is installed in the building 180 may be coupled (e.g., electrically coupled) to the battery pack 110b in the vehicle 100, such as via a cable/connector 106 that can be connected to a charging port 130 of the vehicle 100, an electric vehicle supply equipment 170 (EVSE), a power stage circuit 172, and/or a cable/connector 174. For example, the cable/connector 106 may be coupled to the EVSE 170, which may be coupled to the battery pack 110a via the power stage circuit 172, and/or may be coupled to an external power source 190. In this way, either the external power source 190 or the battery pack 110a may be used as an external power source to charge the battery pack 110b in some use cases. In one or more implementations, the battery pack 110a may also, or alternatively, be coupled (e.g., via a cable/connector 174, the power stage circuit 172, and the EVSE 170) to the external power source 190. The external power source 190 may take the form of a solar power source, a wind power source, and/or an electrical grid of a city, town, or other geographic region (e.g., electrical grid that is powered by a remote power plant). During, for example, instances when the battery pack 110b is not coupled to the battery pack 110a, the battery pack 110a may couple (e.g., using the power stage circuit 172) to the external power source 190 to charge up and store electrical energy. In some use cases, this stored electrical energy in the battery pack 110a may later be used to charge the battery pack 110b (e.g., during times when solar power or wind power is not available, in the case of a regional or local power outage for the building 180, and/or during a period of high rates for access to the electrical grid).

In one or more implementations, the power stage circuit 172 may electrically couple the battery pack 110a to an electrical system of the building 180. For example, the power stage circuit 172 may convert DC power from the battery pack 110a into AC power for one or more loads in the building 180. Exemplary loads coupled, via one or more electrical outlets coupled, to the battery pack 110a may include one or more lights, lamps, appliances, fans, heaters, air conditioners, and/or any other electrical components or electrical loads. The power stage circuit 172 may include control circuitry that is operable to switchably couple the battery pack 110a between the external power source 190 and one or more electrical outlets and/or other electrical loads in the electrical system of the building 180. In one or more implementations, the vehicle 100 may include a power stage circuit (not shown in FIG. 1C) that can be used to convert power received from the EVSE 170 to DC power that is used to power/charge the battery pack 110b, and/or to convert DC power from the battery pack 110 into AC power for one or more electrical systems, components, and/or loads of the vehicle 100.

In one or more use cases, the battery pack 110a may be used as a source of electrical power for the building 180, such as during times when solar power or wind power is not available, in the case of a regional or local power outage for the building 180, and/or during a period of high rates for access to the electrical grid, as non-limiting examples. In one or more other use cases, the battery pack 110b may be used to charge the battery pack 110a and/or to power the electrical system of the building 180 (e.g., in a use case in which the battery pack 110a is low on or out of stored energy and in which solar power or wind power is not available, a regional or local power outage occurs for the building 180, and/or a period of high rates for access to the electrical grid occurs, as non-limiting examples.

Figure 2A:
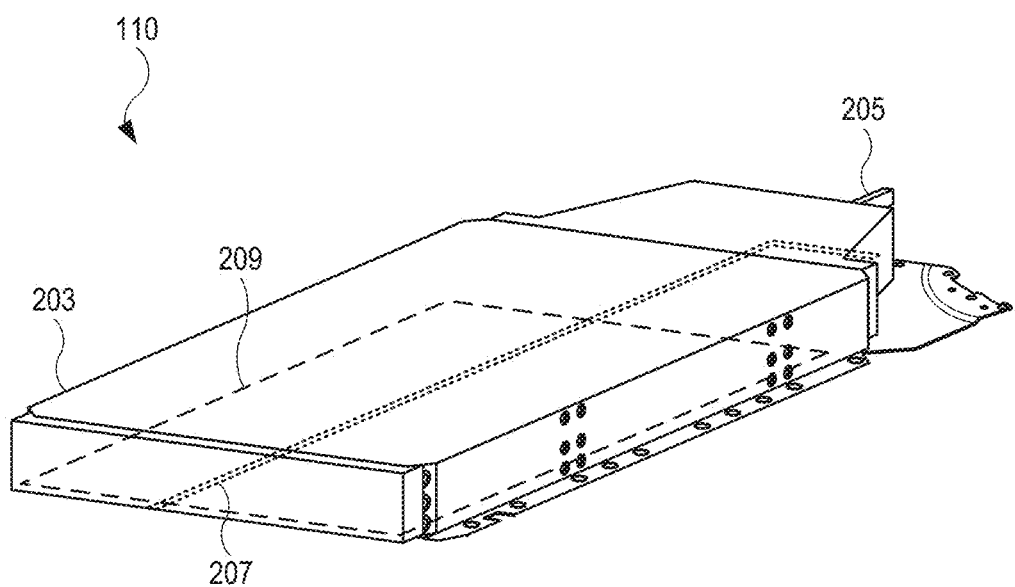
FIG. 2A illustrates a schematic perspective view of a battery pack, in accordance with one or more implementations of the present disclosure.

FIG. 2A illustrates an example of a battery pack 110. As shown, the battery pack 110 may include a battery pack frame 203 (e.g., a battery pack housing or pack frame). The battery pack frame 203 may house or enclose one or more battery modules and/or one or more battery cells, and/or other battery pack components of the battery pack 110. In one or more implementations, the battery pack frame 203 may include or form a shielding structure on an outer surface thereof (e.g., a bottom thereof and/or underneath one or more battery module, battery units, batteries, and/or battery cells) to protect the battery module, battery units, batteries, and/or battery cells from external conditions (e.g., if the battery pack 110 is installed in a vehicle and the vehicle is driven over rough terrain, such as off-road terrain, trenches, rocks, rivers, streams, etc.).

The battery pack 110 may include battery cells (e.g., directly installed within the battery pack 110, or within batteries, battery units, and/or battery modules as described herein) and/or battery modules, and one or more conductive coupling elements for coupling a voltage generated by the battery cells to a power-consuming component, such as the vehicle 100 (shown in FIGS. 1A, 1B, and 1C) and/or an electrical system of the building 180 (shown in FIG. 1C). For example, the conductive coupling elements may include internal connectors and/or contactors that couple together multiple battery cells, battery units, batteries, and/or multiple battery modules within the battery pack frame 203 to generate a desired output voltage for the battery pack 110. The battery pack 110 may also include one or more external connection ports, such as an electrical contact 205 (e.g., a high voltage terminal or connector). As shown, the battery pack 110 may include an electrical contact 205 may electrically couple an external load (e.g., the vehicle or an electrical system of the building) to the battery modules and/or battery cells in the battery pack 110. In this regard, an electrical cable (e.g., cable/connector 106) may be connected between the electrical contact 205 and an electrical system of a vehicle or a building, to provide electrical power to the vehicle or the building.

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules, battery units, batteries, and/or battery cells within the battery pack frame 203, such as by distributing fluid through the battery pack 110. The thermal control structures 207 may form a part of a thermal/temperature control or heat exchange system that includes one or more thermal components 209, which may include plates or bladders that are disposed in thermal contact with one or more battery modules and/or battery cells disposed within the battery pack frame 203. The one or more thermal components 209 may be positioned in contact with one or more battery modules, battery units, batteries, and/or battery cells within the battery pack frame 203. The one or multiple thermal control structures 207 may be provided for each of several top and bottom battery module pairs.

Figure 2B:
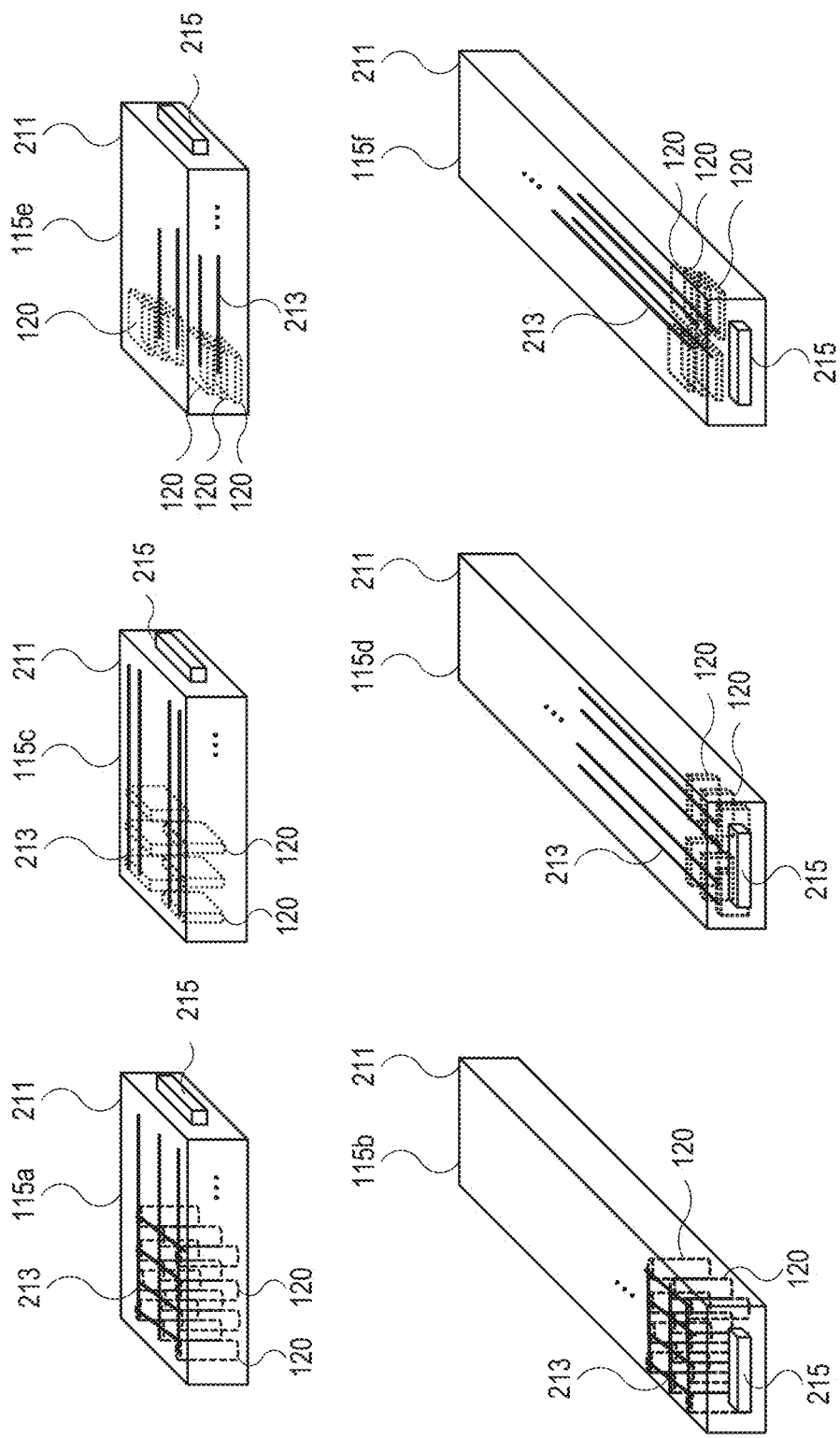
FIG. 2B illustrates schematic perspective views of various battery modules that may be included in a battery pack, in accordance with one or more implementations of the present disclosure.

FIG. 2B depicts various examples of battery modules that may be disposed in a battery pack (e.g., within the battery pack frame 203 of the battery pack 110, shown in FIG. 2A). In an example of FIG. 2B, a battery module 115a is shown that includes a battery module housing 211 having a rectangular cuboid shape with a length that is substantially similar to its width. In this example, the battery module 115a includes battery cells 120 implemented as cylindrical battery cells. The battery module 115a further includes rows and columns of cylindrical battery cells that are coupled together by an interconnect structure 213 (e.g., a current connector assembly or CCA). For example, the interconnect structure 213 may couple together the positive terminals of the battery cells 120, and/or couple together the negative battery terminals of the battery cells 120. As shown, the battery module 115a may further include a bus bar 215 that functions as a charge collector. For example, the bus bar 215 may be electrically coupled to the interconnect structure 213 to collect the charge generated by the battery cells 120 to provide a high voltage output from the battery module 115a.

FIG. 2B also shows a battery module 115b having an elongate shape. The battery module 115b may include a battery module housing 211 in which the length of the (e.g., extending along a direction from a front end to a rear end of the battery module housing 211) is substantially greater than a width (e.g., in a transverse direction to the direction from the front end to the rear end) of the battery module housing 211). In this regard, the battery module 115b (representative of one or more similar battery modules) may span the entire front-to-back length of a battery pack within a battery pack frame. As shown, the battery module 115a may further include an interconnect structure 213 electrically coupled to a bus bar 215, allowing the bus bar 215 may be electrically coupled to the interconnect structure 213 to collect the charge generated by battery cells 120 of the battery module 115b to provide a high voltage output from the battery module 115b.

In the implementations of battery module 115a and battery module 115a, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115c having a battery module housing 211 with a rectangular cuboid shape with a length that is substantially similar to its width and including battery cells 120 implemented as prismatic battery cells. In this example, the battery module 115c includes rows and columns of battery cells 120 that are coupled together by an interconnect structure 213 (e.g., a current collector assembly or CCA). For example, the interconnect structure 213 may couple together the positive terminals of the battery cells 120 and/or couple together the negative battery terminals of the battery cells 120. As shown, the battery module 115c may include a bus bar 215 that functions as a charge collector. For example, the bus bar 215 may be electrically coupled to the interconnect structure 213 to collect the charge generated by the battery cells 120 to provide a high voltage output from the battery module 115c.

FIG. 2B also shows a battery module 115d including prismatic battery cells and having an elongate shape. For example, the battery module 115d includes a battery module housing 211 in which the length of the battery module housing 211 is substantially greater than a width of the battery module housing 211. In this regard, the battery module 115d (representative of one or more similar battery modules) may span the entire front-to-back length of a battery pack within a battery pack frame. As shown, the battery module 115d may also include an interconnect structure 213 and a bus bar 215 electrically coupled to the interconnect structure 213. For example, the bus bar 215 may be electrically coupled to the interconnect structure 213 to collect the charge generated by the battery cells 120 to provide a high voltage output from the battery module 115d.

As another example, FIG. 2B also shows a battery module 115e having a battery module housing 211 having a rectangular cuboid shape with a length that is substantially similar to its width. The battery module housing 211 may carry battery cells 120, each of which being implemented as pouch battery cells. In this example, the battery module 115e includes rows and columns of pouch battery cells that are coupled together by an interconnect structure 213 (e.g., a current collector assembly or CCA). For example, the interconnect structure 213 may couple together the positive terminals of the battery cells 120 and couple together the negative battery terminals of the battery cells 120. As shown, the battery module 115e may also include a bus bar 215 electrically coupled to the interconnect structure 213. For example, the bus bar 215 may be electrically coupled to the interconnect structure 213 to collect the charge generated by the battery cells 120 to provide a high voltage output from the battery module 115e.

FIG. 2B also shows a battery module 115f including pouch battery cells and having an elongate shape. For example, the battery module 115d includes a battery module housing 211 in which the length of the battery module housing 211 is substantially greater than a width of the battery module housing 211. In this regard, the battery module 115d (representative of one or more similar battery modules) may span the entire front-to-back length of a battery pack within a battery pack frame. In this regard, the battery module 115f (representative of one or more similar battery modules) may span the entire front-to-back length of a battery pack within a battery pack frame. As shown, the battery module 115f may also include an interconnect structure 213 and a bus bar 215 electrically coupled to the interconnect structure 213. For example, the bus bar 215 may be electrically coupled to the interconnect structure 213 to collect the charge generated by the battery cells 120 to provide a high voltage output from the battery module 115f.

In various implementations, a battery pack (e.g., battery pack 110 shown in FIG. 2A) may be provided with one or more of any of the battery modules 115a, 115b, 115c, 115d, 115e, and 115f. In one or more other implementations, a battery pack may be provided without any of the battery modules 115a, 115b, 115c, 115d, 115e, and 115f (e.g., in a cell-to-pack implementation).

In one or more implementations, battery modules in any of the implementations of FIG. 2B may be coupled (e.g., in series) to a current collector of a battery pack. In one or more implementations, the current collector may be coupled, via a high voltage harness, to one or more external connectors on a battery pack (e.g., electrical contact 205 of the battery pack 110, shown in FIG. 2A). In one or more implementations, a battery pack may be provided without any battery modules 115. For example, in a cell-to-pack configuration, the battery cells 120 are arranged directly into a battery pack without assembly into a battery module (e.g., without including the battery module housing 211). For example, a battery pack frame of a battery pack (e.g., the battery pack frame 203 of the battery pack 110 shown in FIG. 2A) may include or define a plurality of structures for positioning of the battery cells 120 directly within the battery pack frame.

Figure 2C:
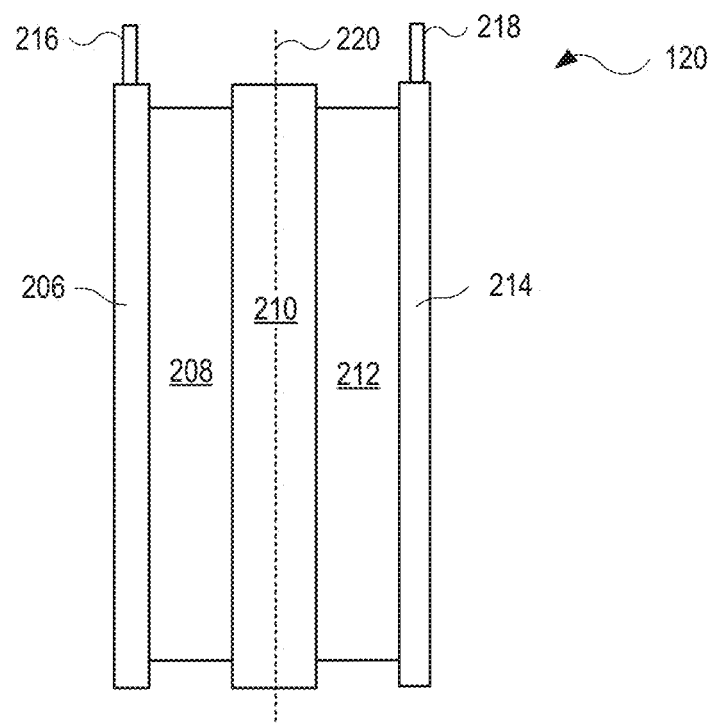
FIG. 2C illustrates a cross-sectional end view of a battery cell, in accordance with one or more implementations of the present disclosure.

FIG. 2C illustrates a cross-sectional end view of a portion of a battery cell 120. As shown, the battery cell 120 may include an anode 208, an electrolyte 210, and a cathode 212. As shown, the anode 208 may include or be electrically coupled to a first current collector 206 (e.g., a metal layer such as a layer of copper foil or other metal foil). Also, the cathode 212 may include or be electrically coupled to a second current collector 214 (e.g., a metal layer such as a layer of aluminum foil or other metal foil). The battery cell 120 may further include a terminal 216 (e.g., a negative terminal) coupled to the anode 208 (e.g., via the first current collector 206) and a terminal 218 (e.g., a positive terminal) coupled to the cathode (e.g., via the second current collector 214). In various implementations, the electrolyte 210 may take the form of a liquid electrolyte layer or a solid electrolyte layer. In one or more implementations in which the electrolyte 210 is a liquid electrolyte layer, the battery cell 120 may include a separator layer 220 that separates the anode 208 from the cathode 212. In one or more implementations in which the electrolyte 210 is a solid electrolyte layer, the electrolyte 210 may function as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. In an implementation in which the battery cell 120 is implemented as a lithium-ion battery cell, the electrolyte 210 may include a lithium salt in an organic solvent.

The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cell 120 is implemented as lithium-ion battery cells, the battery cell 120 may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials. In various implementations, the anode 208, the electrolyte 210, and the cathode 212 can be packaged into a battery cell housing having any of various shapes, and/or sizes, and/or formed from any of various suitable materials. For example, the battery cell 120 may include a cylindrical, rectangular, square, cubic, flat, pouch, elongated, or prismatic outer shape.

Figure 2D:
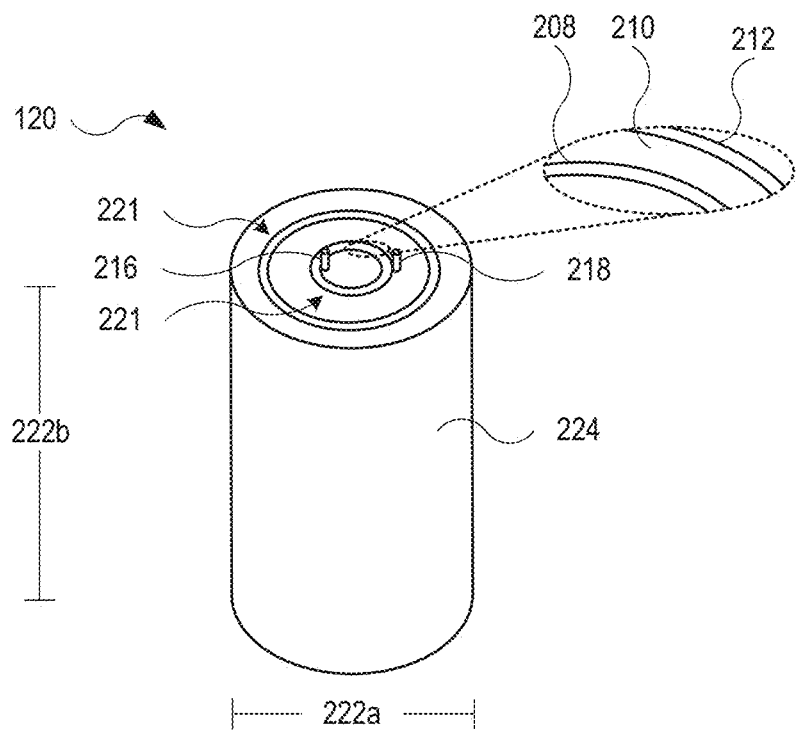
FIG. 2D illustrates a cross-sectional perspective view of a cylindrical battery cell, in accordance with one or more implementations.

As depicted in FIG. 2D, for example, a battery cell 120 may be implemented as a cylindrical cell. Accordingly, the battery cell 120 includes dimension 222a (e.g., cylinder diameter, battery cell diameter) and a dimension 222b (e.g., cylinder length). The battery cell 120, and other battery cells described herein, may include dimensional information derived from a 4-number code. For example, in some embodiments, the battery cell 120 includes an XXYY battery cell, in which "XX" refers to the dimension 222a in millimeters (mm) and "YY" refers to the dimension in mm. Accordingly, when the battery cell 120 includes a "2170" battery cell, the dimension 222a is 21 mm and the dimensions 222b is 70 mm. Alternatively, when the battery cell 120 includes a "4680" battery cell, the dimension 222a is 46 mm and the dimensions 222b is 80 mm. The foregoing examples of dimensional characteristics for the battery cell 120 should not be construed as limiting, and the battery cell 120, and other battery cells described herein with a cylindrical form factor, may include various dimension. For example, the dimension 222a and the dimension 222b may be greater than 46 mm and 80 mm, respectively.

FIG. 2D illustrates a battery cell 120 that includes a cell housing 224 having a cylindrical outer shape. As shown in the enlarged view, the anode 208, the electrolyte 210, and the cathode 212 may be rolled into one or more windings 221. The one or more windings 221 may include one or more substantially cylindrical windings, as a non-limiting example. As shown, one or more windings 221 of the anode 208, the electrolyte 210, and the cathode 212 (e.g., and/or one or more separator layers such as separator layer 220 shown in FIG. 2C) may be disposed within the cell housing 224. For example, a separator layer may be disposed between adjacent ones of the one or more windings 221. Additionally, the battery cell 120 in the cylindrical cell implementation of FIG. 2D includes a terminal 216 and a terminal 218. The terminal 218 may include a first polarity terminal, such as a positive terminal, that is coupled to the cathode 212. The terminal 216 may include a second polarity terminal, such as a negative terminal, that is coupled to the anode 208. The terminals 216 and 218 can be made from electrically conductive materials to carry electrical current from the battery cell 120 directly or indirectly (e.g., via a current carrier assembly, a bus bar, and/or other electrical coupling structures) to an electrical load, such as a component or system of a vehicle or a building shown and/or described herein. However, the cylindrical cell implementation of FIG. 2D is merely illustrative, and other implementations of the battery cells 120 are contemplated.

Figure 2E:
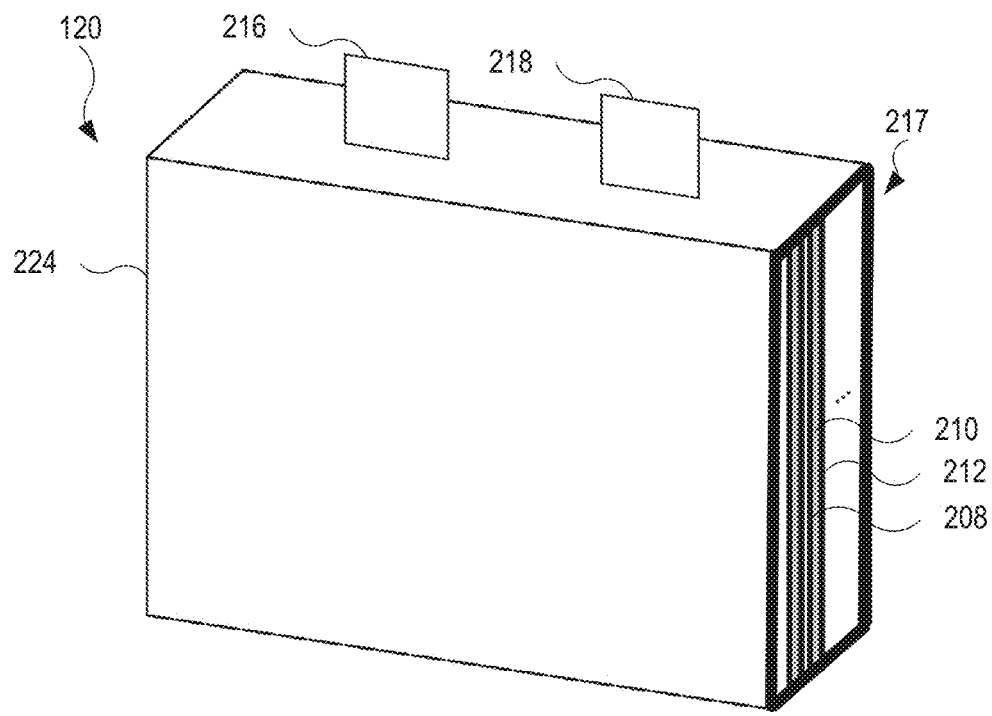
FIG. 2E illustrates a cross-sectional perspective view of a prismatic battery cell, in accordance with one or more implementations of the present disclosure.

FIG. 2E illustrates an example in which the battery cell 120 is implemented as a prismatic cell. As shown, the battery cell 120 may include a cell housing 224 having a right prismatic outer shape. Also, one or more layers of the anode 208, the cathode 212, and the electrolyte 210 disposed therebetween may be disposed (e.g., with separator materials between the layers) within the cell housing 224. As examples, multiple layers of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 224. The cell housing 224 may include a cross-sectional width 217 that is relatively thick and is formed from a rigid material. For example, the cell housing 224 may be formed from a welded, stamped, deep drawn, and/or impact extruded metal sheet, such as a welded, stamped, deep drawn, and/or impact extruded aluminum sheet. The cross-sectional width 217 of the cell housing 224 may be as much as, or more than 1 millimeter (mm) to provide a rigid housing for the prismatic battery cell. In one or more implementations, a terminal 216 and a terminal 218 in the prismatic cell implementation of FIG. 2E may be formed from a feedthrough conductor that is insulated from the cell housing 224 (e.g., a glass to metal feedthrough) as the conductor passes through to cell housing 224 to expose the terminal 216 and the terminal 218 outside the cell housing 224 in order to contact an interconnect structure (e.g., interconnect structure 213 shown in FIG. 2B). However, this implementation of FIG. 2E is also illustrative and yet other implementations of the battery cell 120 are contemplated.

Figure 2F:
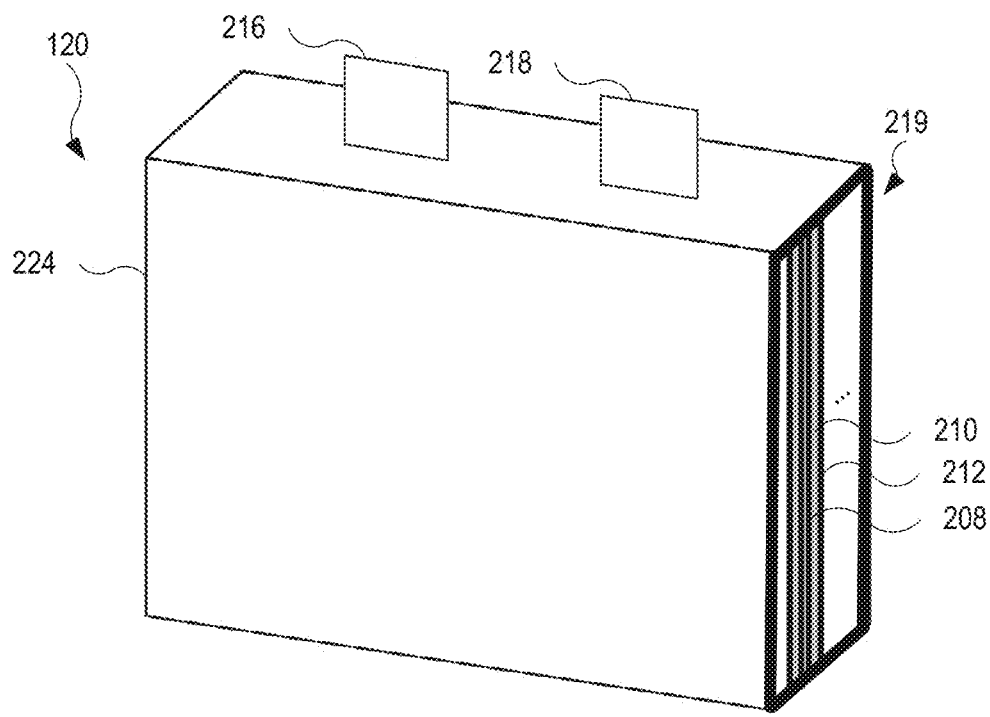
FIG. 2F illustrates a cross-sectional perspective view of a pouch battery cell, in accordance with one or more implementations of the present disclosure.

FIG. 2F illustrates an example in which the battery cell 120 is implemented as a pouch cell. As shown, the battery cell 120 may include a cell housing 224 that forms a flexible or malleable pouch housing. One or more layers of the anode 208, the cathode 212, and the electrolyte 210 disposed therebetween may be disposed (e.g., with separator materials between the layers) within the cell housing 224. In the implementation of FIG. 2F, the cell housing 224 may include a cross-sectional width 219 that is relatively thin. For example, the cell housing 224 in the implementation of FIG. 2F may be formed from a flexible or malleable material (e.g., a foil, such as a metal foil, or film, such as an aluminum-coated plastic film). The cross-sectional width 219 of the cell housing 224 may be as low as, or less than, 0.1 mm, 0.05 mm, 0.02 mm, or 0.01 mm to provide flexible or malleable housing for the pouch battery cell. In one or more implementations, a terminal 216 and a terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 224 in these implementations. In the examples of FIGS. 2C, 2E, and 2F, the terminal 216 and the terminal 218 are formed on the same side (e.g., a top side) of the battery cell 120. However, this is merely illustrative and, in other implementations, the terminal 216 and the terminal 218 may formed on two different sides (e.g., opposing sides, such as a top side and a bottom side) of the battery cell 120. The terminal 216 and the terminal 218 may be formed on a same side or difference sides of the cylindrical cell of FIG. 2D in various implementations.

In one or more implementations, a battery module, a battery pack, a battery unit, or any other battery may include some battery cells that are implemented as solid-state battery cells and other battery cells that are implemented with liquid electrolytes for lithium-ion or other battery cells having liquid electrolytes. In one or more implementations, one or more of the battery cells may be included a battery module or a battery pack, such as to provide an electrical power supply for components of a vehicle and/or a building previously described, or any other electrically powered component or device. A cell housing of the battery cell can be disposed in the battery module, the battery pack, or installed in any of the vehicle, the building, or any other electrically powered component or device.

Figure 3:
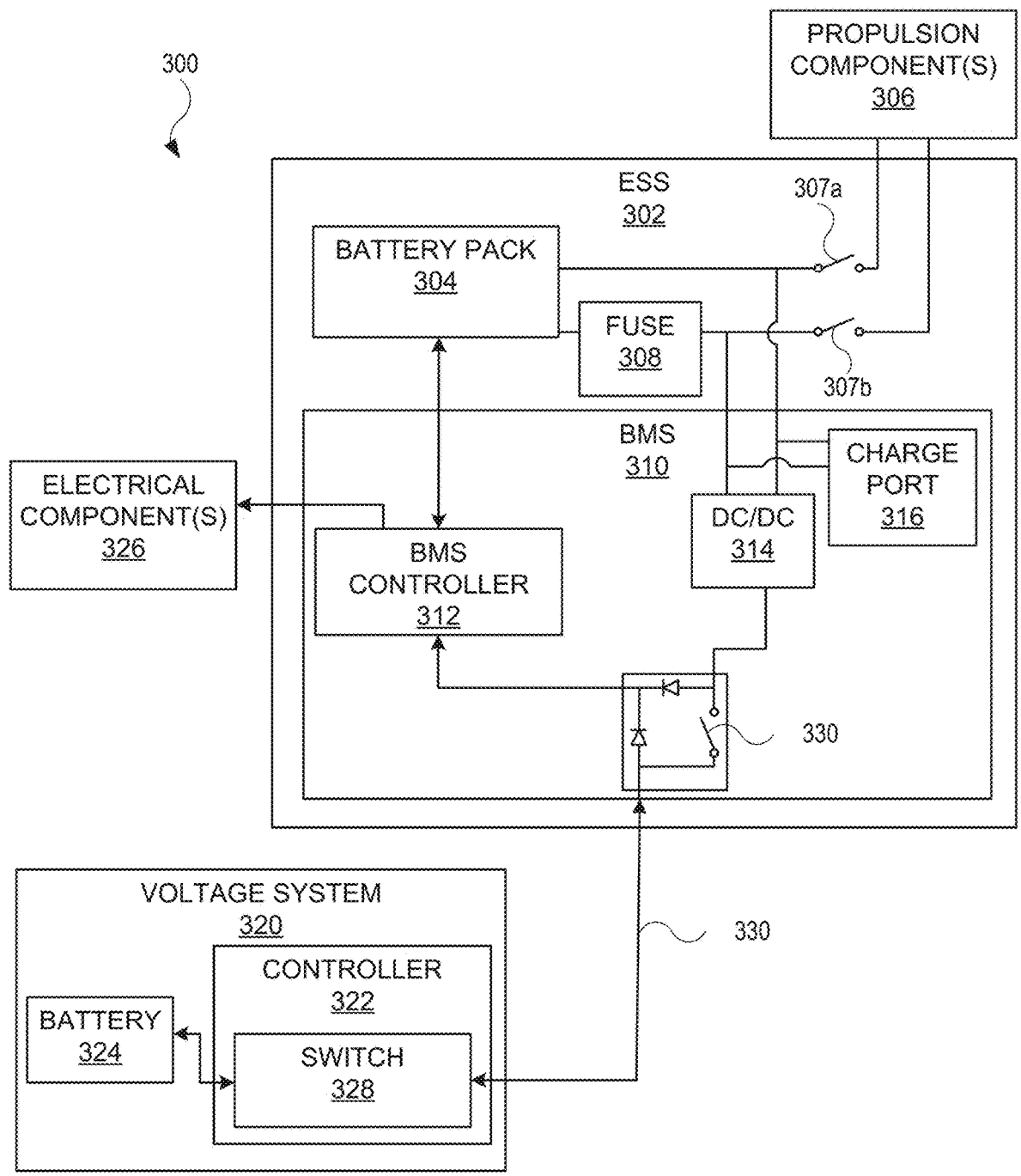
FIG. 3 illustrates a block diagram of an apparatus, in accordance with one or more implementations of the present disclosure.

FIG. 3 illustrates a block diagram of an apparatus 300, in accordance with one or more implementations of the present disclosure. The apparatus 300 may be implemented in a vehicle, such as the vehicle 100 (shown in FIGS. 1A and 1B). The respective blocks of the components of the apparatus 300 may include one or more circuits (e.g., processing circuits, microcontrollers, microelectromechanical systems, application-specific integrated circuits, or a combination thereof) designed to carry out one or more specific functions.

As shown, the apparatus 300 may include an energy storage system 302 (ESS). The energy storage system 302 may include a battery pack 304. In one or more implementations, the battery pack 304 stores energy (e.g., electrical energy) for one or more components of a vehicle, and provides a voltage output approximately in the range of 400 to 900 Volts (V). In this regard, the battery pack 304 may be referred to as a high voltage source. The battery pack 304 may include any features shown and/or described herein for a battery pack (e.g., battery pack 110 of the vehicle 100, shown in FIG. 1A) or other battery assembly or subassembly shown and/or described herein. The battery pack 304 may include several battery cells used to supply power to one or more propulsion components 306. The one or more propulsion components 306 may take the form of one or more electric motors used to provide torque to move one or more wheels of a vehicle (e.g., wheels 102 of the vehicle 100 shown in FIG. 1). In order to permit the one or more propulsion components 306 to receive power from the battery pack 304, the energy storage system 302 may further include a switch 307a and a switch 307b. The switches 307a and 307b may include mechanical switches or solid-state switches, as non-limiting examples. The energy storage system 302 may further include a fuse 308 designed to open a circuit between the battery pack 304 and the one or more propulsion components 306 in response to certain events (e.g., a vehicle accident). In one or more implementations, the fuse 308 takes the form of a pyro fuse.

The apparatus 300 may further include a battery management system 310 (BMS). In one or more implementations, the battery management system 310 monitors the battery pack 304 to determine one or more characteristics of the battery pack 304. The battery management system 310 may include a battery management system controller 312 (BMS CONTROLLER) that communicates with a communication circuit (not shown in FIG. 3) electrically coupled with the battery pack 304. In this regard, the battery management system 310 can monitor output voltage, output current, and/or temperature of the battery pack 304. Further, the battery management system 310 can control, or regulate, output voltage and/or output current, which may control the temperature of the battery pack 304. As a result, the battery management system 310 may be used to optimize performance of the battery pack 304, as well as manage the battery pack 304 based on an operational mode of a vehicle in which the apparatus 300 is integrated.

The battery management system 310 system may further include a DC to DC converter 314 (DC/DC). The DC to DC converter 314 is designed to convert a voltage level that is output from the battery pack 304 to another voltage level. For example, in one or more implementations, the DC to DC converter 314 converts (e.g., steps down) a high voltage level from the battery pack 304 and outputs a relatively lower voltage level. For example, the lower voltage level may be approximately in the range of 9-18 V. In one or more implementations, the voltage is 12 V. As non-limiting examples, the DC to DC converter 314 includes a step down converter, such as a buck converter, a buck-boost converter, a flyback converter, or the like. Also, in one or more implementations, the apparatus 300 includes multiple sensors (e.g., temperature sensor, current sensor, voltage sensors) are connected to the battery management system controller 312 and the DC to DC converter 314, which allows the battery management system controller 312 to detect temperature, current, and/or voltage of the DC to DC converter 314.

The battery management system 310 may further include a charge port 316. The charge port 316 may receive an alternating current (AC) power supply and convert the AC power supply to a DC power supply that is used to charge the battery pack 304. Although not expressly shown, in one or more implementations, the apparatus 300 further includes an EVSE (e.g., similar to the EVSE 170 shown in FIG. 1C) used to deliver a DC power supply, including fast DC charging, to the battery pack 304. When integrated with the apparatus 300, the EVSE may also be implemented in a vehicle. Alternatively or in combination, in one or more implementations, the apparatus 300 further includes an onboard charger (OBC) that includes circuitry used to convert an AC power supply to a DC power supply to charge the battery pack 304.

The apparatus 300 may further include a voltage system 320. In one or more implementations, the voltage system 320 is used as a power distribution system for various components of a vehicle. In this regard, the voltage system 320 may include a controller 322 that provides instructions and/or commands for power distribution. The voltage system 320 may include a battery 324. In one or more implementations, the battery 324 is a 12-V battery (e.g., outputs a voltage of approximately 12 V). As shown, the battery 324 represents a separate voltage source from that of the battery pack 304, and accordingly, a separate voltage source from the energy storage system 302. Using the voltage system 320 (and in particular, the battery 324), the controller 322 may supply power (e.g., DC power) to one or more electrical components 326 of a vehicle via the battery management system controller 312. As non-limiting examples, the one or more electrical components 326 may include power seats, lights, a heating unit, an air conditioning unit, one or more sensors (e.g., ultrasonic sensors, cameras), a vehicle security system (e.g., anti-theft system), a display monitor, power steering, power braking, power doors. Generally, the one or more electrical components 326 may include any electrical component(s) of a vehicle that is rated for voltage and power provided by the battery 324. Although not shown, the voltage system may include an additional DC to DC converter. The DC to DC converter may be used to convert a DC voltage for another an additional controller of the apparatus 300.

In one or more implementations, the DC to DC converter 314 is designed to convert the voltage level of the battery pack 304 to the voltage level of the battery 324. Accordingly, the DC to DC converter 314 may be designed to convert the voltage level of the battery pack 304 to 12 V (or approximately 12 V). Also, in one or more implementations, the DC to DC converter 314 may supply power to the one or more electrical components 326. This will be discussed further below.

The voltage system 320 may further include a switch 328. In one or more implementations, the switch 328 takes the form of a bi-directional switch. In this regard, the switch 328 may support current flow (e.g., electrical current flow) in two directions. As a non-limiting example, the switch 328 may include multiple transistor switches and diodes to conduct current in two different directions. The apparatus 300 may further include a conductive pathway 330 that couples (e.g., electrically couples) the energy storage system 302 with the voltage system 320. The conductive pathway 330 may include one or more wires or a bus, as non-limiting examples. As a bi-directional switch, the switch 328 may permit current to flow from the energy storage system 302 to the voltage system 320. For example, using the switch 328 and the conductive pathway 330, the battery 324 may supply power to the one or more electrical components 326 (via the battery management system controller 312) as well as to battery management system 310, including one or more components of the battery management system 310. Further, using the switch 328 and the conductive pathway 330, the DC to DC converter 314 may supply power to the voltage system 320, including one or more components of the voltage system 320. In this regard, the battery management system 310 may further include a switch 307c. When the switch 307c is in a closed position (not shown in FIG. 3), the DC to DC converter 314 may supply power (including electrical current) to the voltage system 320, including the battery 324.

Although not shown, the apparatus 300 may include additional controllers designed to control various assigned zones of a vehicle. The additional controls may be electrically coupled with the energy storage system 302 (including the battery management system 310) and/or the voltage system 320.

Figure 4:
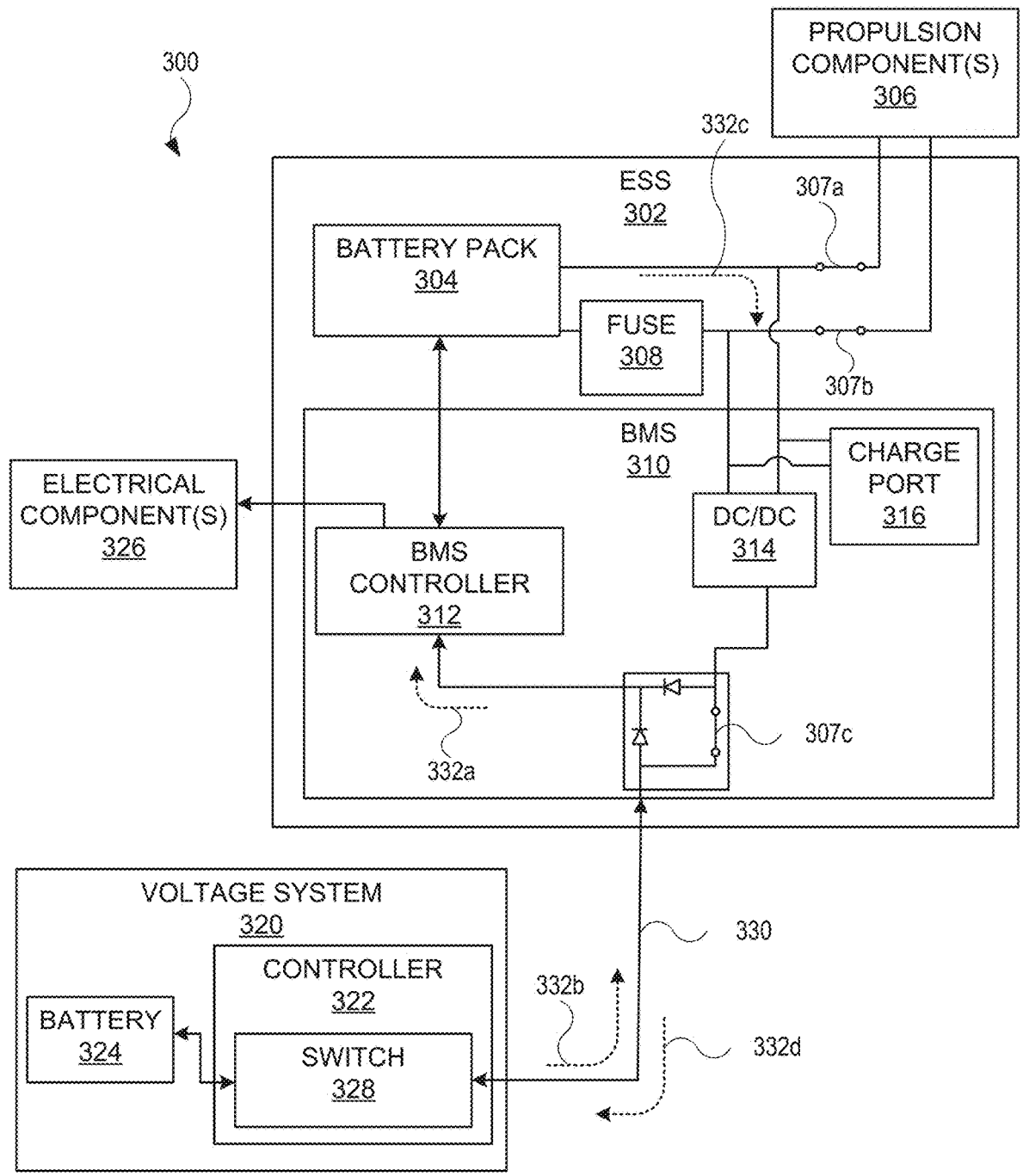
FIG. 4 illustrates a block diagram of an apparatus in a mode of a vehicle, in accordance with one or more implementations of the present disclosure.

FIG. 4 illustrates a block diagram of the apparatus 300 in a mode of a vehicle, in accordance with one or more implementations of the present disclosure. In one or more implementations, the mode of the apparatus 300 is configured for a drive mode of the vehicle. In the drive mode, the apparatus 300, when integrated in a vehicle, may be configured for driving and propelling the vehicle in a desired direction. As shown, the switches 307a and 307b are in a closed position and permit the battery pack 304 to supply power (e.g., high voltage) to the one or more propulsion components 306. The one or more propulsion components 306 may generate torque to one or more wheels of the vehicle to in order to move the vehicle.

Several arrows with dotted lines are shown to indicate direction of current flow, resulting in supplied power, in the mode shown in FIG. 4. For example, an arrow 332a and an arrow 332b represent a direction of current flow from the voltage system 320 to the one or more electrical components 326 via the battery management system controller 312, with the arrow 332b showing a direction of current flow from the voltage system 320 to the battery management system 310 via the conductive pathway 330. In particular, the battery 324 may provide the electrical current to the one or more electrical components 326 and the battery management system 310.

Further, an arrow 332c represents a direction of current flow from the battery pack 304 to the DC to DC converter 314. The DC to DC converter 314 may convert the voltage level from the battery pack 304 to a different (e.g., lower) voltage level. When the switch 307c is closed, the DC to DC converter 314 may supply power to the voltage system 320, as indicated by the direction of an arrow 332d via the conductive pathway 330. Based on the bi-directional capabilities, the switch 328 may permit or facilitate current flow in two different directions (e.g., based on the direction of the arrows 332b and 332d). The power supplied by the DC to DC converter 314 to the voltage system 320 may charge the battery 324. Moreover, in one or more implementations, the DC to DC converter 314 is configured to float charge the battery 324. In this regard, the charge level of the battery 324 may remain at a relatively high level (90% or more of the maximum, or 100%, charge level). As a result, the battery 324 undergoes fewer cycling events, which may extend the life of the battery 324.

Figure 5:
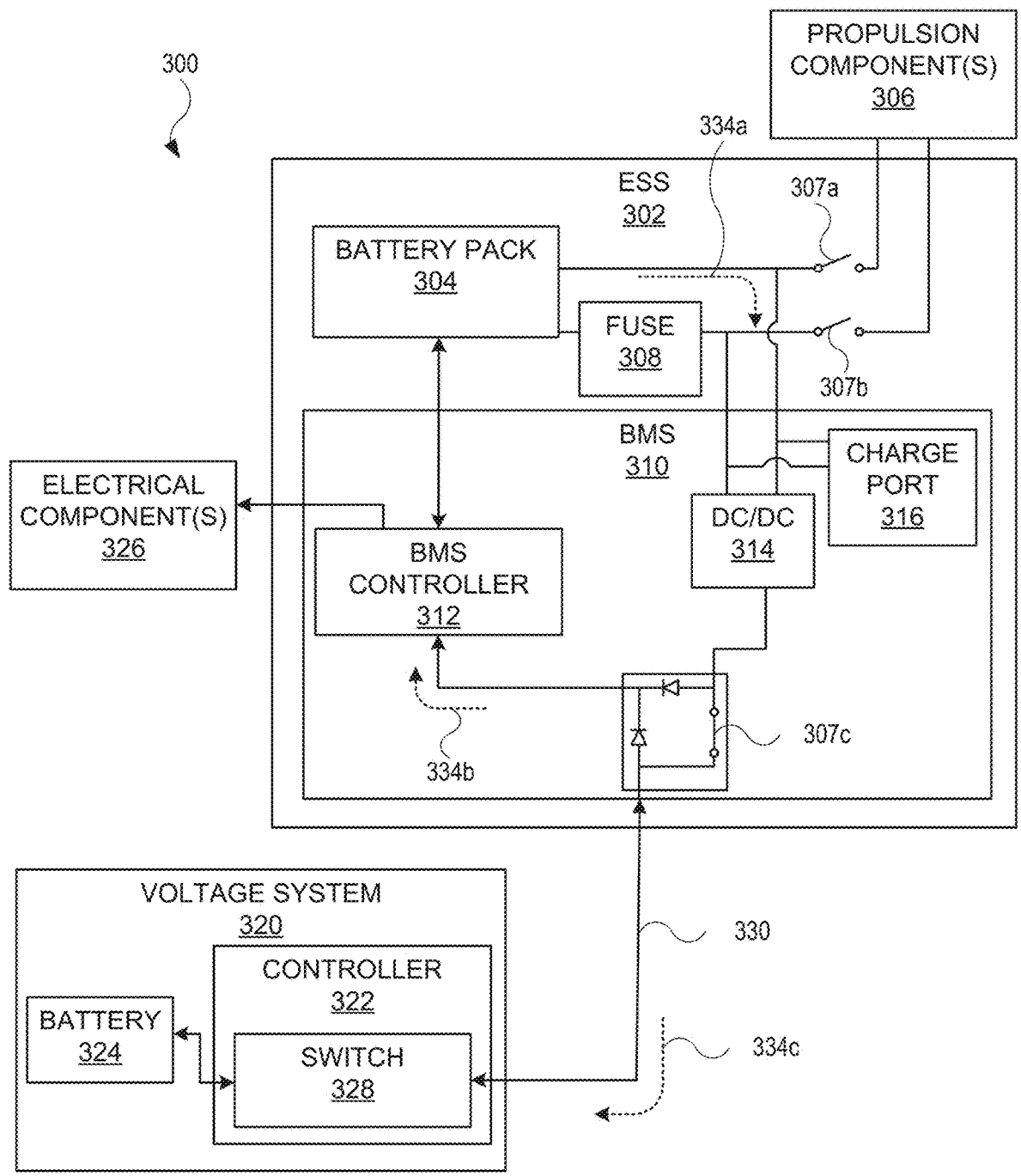
FIG. 5 illustrates a block diagram of an apparatus in an alternate mode of a vehicle, in accordance with one or more implementations of the present disclosure.

FIG. 5 illustrates a block diagram of the apparatus 300 in an alternate mode of a vehicle, in accordance with one or more implementations of the present disclosure. In one or more implementations, the mode of the apparatus 300 is configured for a sleep mode of the vehicle. In the sleep mode, the apparatus 300, when integrated in a vehicle, may be configured for non-driving, such as a parked vehicle or an otherwise non-moving or stationary vehicle. In this regard, the switches 307a and 307b transition to an open position, and the battery pack 304 is no longer supplying power to the one or more propulsion components 306.

Several arrows with dotted lines are shown to indicate direction of current flow in the mode shown in FIG. 5. For example, an arrow 334a represents a direction of current flow from the battery pack 304 to the DC to DC converter 314. Further, an arrow 334b represents a direction of current flow from the DC to DC converter 314 to the one or more electrical components 326 via the battery management system controller 312. Also, when the switch 307c is closed, the DC to DC converter 314 may supply current to the voltage system 320 via the conductive pathway 330, as indicated by the direction of an arrow 334c.

The controller 322 may indicate (e.g., by providing a control signal or other instructions) to the battery management system 310 that the apparatus 300 is entering the sleep mode. The controller 322 may provide instructions to cease power to various loads (e.g., the one or more electrical components 326), thus reducing current output. This may include placing the battery 324 in an inactive state, thus preventing the loads from receiving power from the battery 324. However, the controller 322 may instruct the DC to DC converter 314 to supply current to one or more electrical components 326, as indicated by the arrow 334b. Additionally, the DC to DC converter 314 may be used to power the battery management system 310. Moreover, the DC to DC converter 314 may still be configured to float charge the battery 324. In this regard, battery management system 310 can both control the battery pack 304 to output both a high voltage (e.g., for the one or more propulsion components 306) in the drive mode (shown in FIG. 4), and use the DC to DC converter 314 to convert the received voltage from the battery pack 304 to a low voltage to supply power to the one or more electrical components 326 in the sleep mode.

Accordingly, in the sleep mode, both the battery pack 304 and the DC to DC converter 314 may remain in an active state to supply current to the various components of the apparatus 300 as well as to components of a vehicle that integrates the apparatus 300. The battery pack 304 and the DC to DC converter 314 may each be wired pre-contactor, thus providing a power source with an unswitched voltage source. Further, in multiple modes, the DC to DC converter 314 is capable of reducing the voltage level of the unswitched voltage source from the battery pack 304. Also, the DC to DC converter 314 may provide a redundant backup power source, as the DC to DC converter 314 effectively provides the same, or at least substantially similar, power supply functions as those of the battery 324. Beneficially, the battery pack 304 and the DC to DC converter 314 are both "always on," and available in at least two different modes. Also, in addition to the sleep mode, the DC to DC converter 314 may supply power to the one or more electrical components 326 and/or the battery management system controller 312 in response to a loss of power from the voltage system 320 or a component thereof in the event the component becomes inoperable or inactive.

Figure 6:
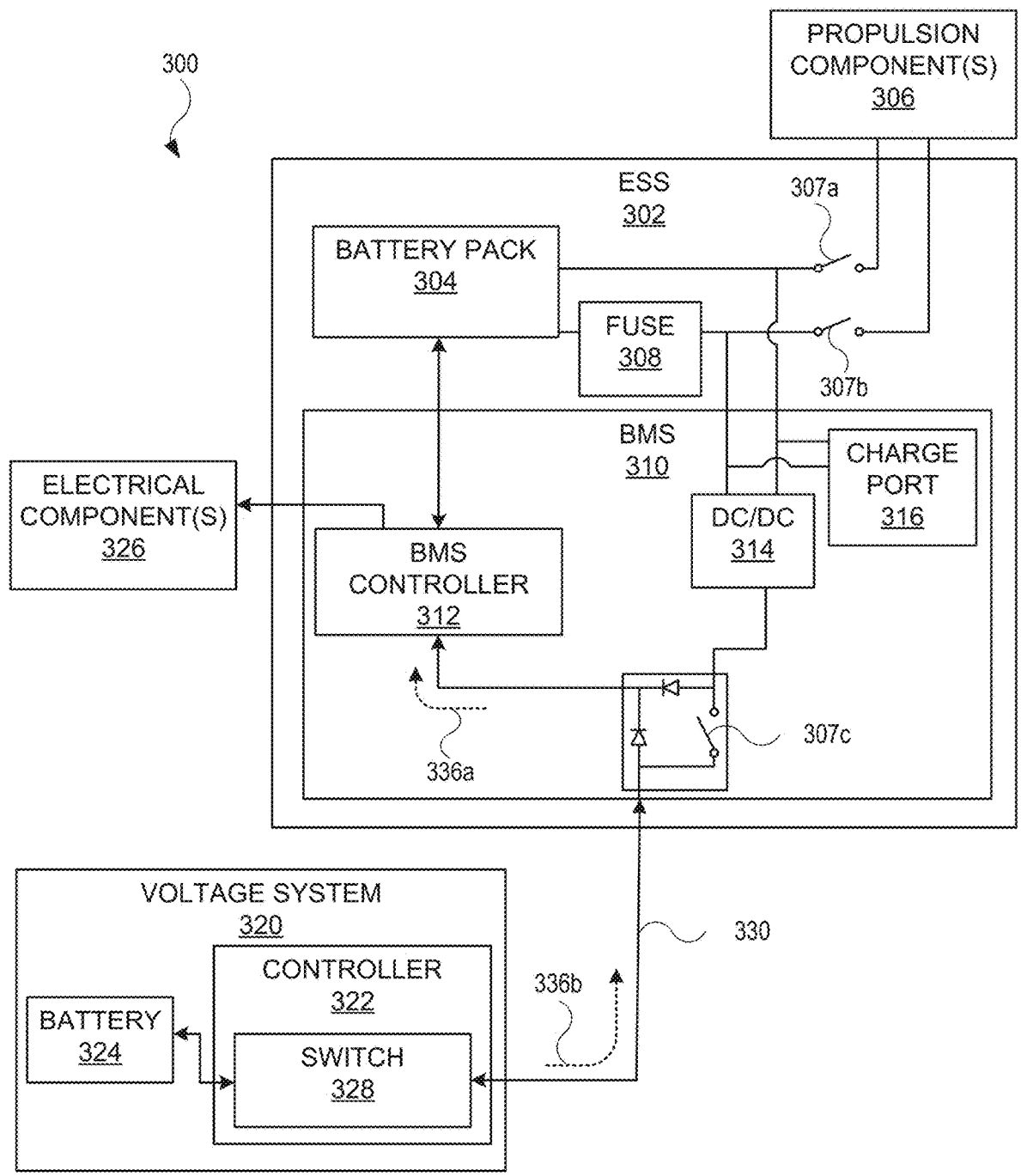
FIG. 6 illustrates a block diagram of an apparatus in an additional alternate mode of a vehicle, in accordance with one or more implementations of the present disclosure.

FIG. 6 illustrates a block diagram of the apparatus 300 in an alternate mode of a vehicle, in accordance with one or more implementations of the present disclosure. In one or more implementations, the mode of the apparatus 300 is associated with the battery pack 304 being unavailable for supplying power. In the mode described in FIG. 6, the apparatus 300, when integrated in a vehicle, is configured for non-driving.

Several arrows with dotted lines are shown to indicate direction of current flow in the mode shown in FIG. 6. For example, an arrow 336a and an arrow 336b represent a direction of current flow from the voltage system 320 to the one or more electrical components 326 via the battery management system controller 312, with the arrow 336b showing a direction of current flow from the voltage system 320 to the battery management system 310 via the conductive pathway 330. In particular, the battery 324 may provide the electrical current to the one or more electrical components 326 and the battery management system 310.

In the mode shown in FIG. 6, the controller 322 may indicate (e.g., by providing a control signal or other instructions) to the battery management system 310 that the DC to DC converter 314 is unavailable for providing current (e.g., by converting the voltage level from the battery pack 304). This may be due to, for example, inoperability or unavailability of the battery pack 304 and/or the DC to DC converter 314. Additionally, the switches 307a and 307b may be in an open position and the battery pack 304 is incapable of supplying power to the one or more propulsion components 306. Alternatively or in combination, the fuse 308 may be triggered, thus opening a circuit between the battery pack 304 and the DC to DC converter 314. Alternatively, a vehicle that integrates the apparatus 300 may be undergoing an update (e.g., over the air software update) to the battery pack 304, including a component of the battery pack 304, thus rendering the battery pack 304 unavailable during the update. However, the controller 322 and/or the battery management system controller 312 may instruct the battery 324 to supply power to one or more electrical components 326, as indicated by the arrow 336a. Additionally, the battery 324 may be used to again power the battery management system 310. Accordingly, the battery 324 may also provide a redundant backup power source. Due to the smaller capacity, the battery 324 may provide a power source for a shorter duration as compared to that of the battery pack 304. However, the battery 324 may nonetheless power at least some components of the vehicle. For example, when an emergency situation occurs and the battery pack 304 and/or the DC to DC converter 314 are unavailable, the battery 324 may power components such as power steering and/or braking, thus allowing the vehicle to maneuver to a safe location. Moreover in one or more implementations, the DC to DC converter 314 provides a redundant power supply to the battery management system 310 (including the battery management system controller 312) in the event of a loss of power from the battery 324 of the voltage system 320 to the battery management system controller 312.

Figure 7:
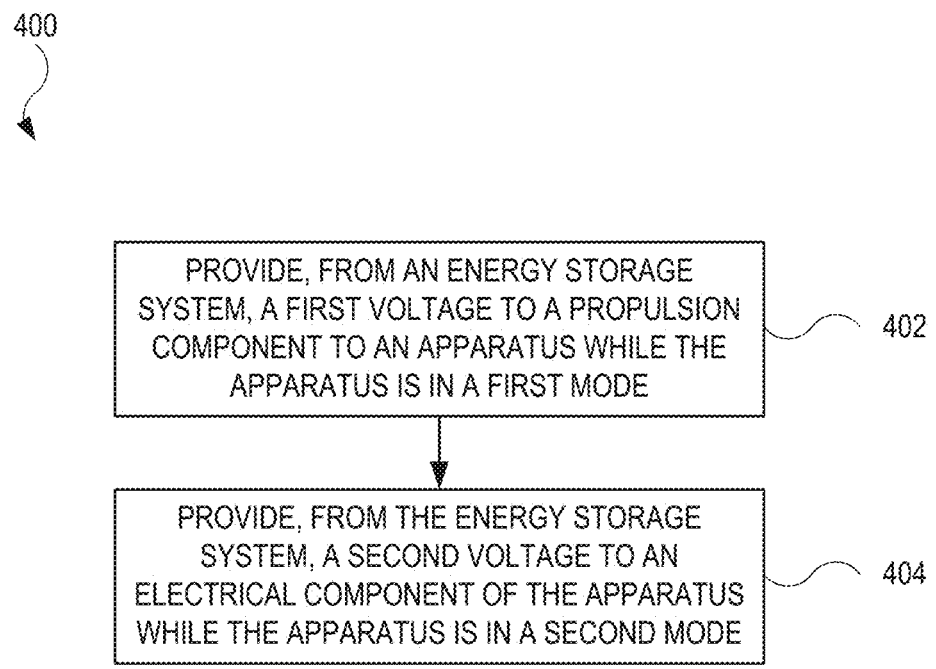
FIG. 7 illustrates a flow diagram showing an example of a process that may be performed for providing power from different power sources to different components, in accordance with implementations of the subject technology.

FIG. 7 illustrates a flow diagram showing an example of a process 400 that may be performed for providing power from different power sources to different components, in accordance with implementations of the subject technology. A battery management system that includes a DC to DC converter may be used in part to carry out one or more steps of the process 400. For explanatory purposes, the process 400 is primarily described herein with reference to the apparatus 300 shown in FIGS. 3-6. However, the process 400 is not limited to the apparatus 300, and one or more blocks (or operations) of the process 400 may be performed by one or more other components of other suitable moveable apparatuses, devices, or systems. Further for explanatory purposes, some of the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, a first voltage is provided from an energy storage system to a propulsion component of an apparatus while the apparatus is in a first mode. In one or more implementations, the first mode takes the form of a drive mode of a vehicle in which the apparatus is integrated. A battery management system may provide the first voltage to the propulsion component. Also, the first voltage may be a relatively high voltage, such as a voltage having a voltage level of more than one hundred or several hundred volts.

At block 404, a second voltage is provided from the energy storage system to an electrical component of the apparatus while the apparatus is in a second mode. In one or more implementations, the second mode takes the form of a sleep mode of a vehicle in which the apparatus is integrated. Further, in one or more implementations, the first voltage and the second voltage are both provided from the same power source (e.g., a high voltage battery pack, such as battery pack 110 and/or battery pack 304 shown and described herein). For example, the battery management system may include a DC to DC converter designed to convert a battery pack with a high voltage level to a lower voltage level (e.g., approximately 12 V). Alternatively, the second voltage may be provided (e.g., in the second mode and/or a third mode) by a battery that is separate from the energy storage system (including a battery pack). The second voltage may be lower than the first voltage.

In one or more implementations, the DC to DC converter may convert the high voltage level to a lower voltage level in order to supply power to the electrical components. Additionally, the DC to DC converter may supply power (e.g., from the high voltage battery pack) to float charge the battery.

Aspects of the subject technology can help extend the life of a battery in a vehicle. This can help facilitate the functioning of and/or proliferation of batteries, which can positively impact the climate by reducing greenhouse gas emissions.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
    a battery management system configured to:
        provide a first voltage, using an energy storage system, to a propulsion component in a first mode;
        provide a second voltage, using a voltage system and via a bi-directional switch, to an electrical component in the first mode, wherein the voltage system is separate from the energy storage system,
        provide the second voltage, using the energy storage system and a direct current (DC) to DC converter, to the electrical component in a second mode different from the first mode, wherein the second voltage is lower than the first voltage, and
        receive, via the bi-directional switch and in the first mode, the second voltage from the voltage system.

2. The apparatus of claim 1, wherein the DC to DC converter is configured to, in the second mode, reduce the first voltage to the second voltage.

3. The apparatus of claim 1, wherein:
    the energy storage system comprises a battery pack, and
    the voltage system comprises a battery.

4. The apparatus of claim 3, wherein the DC to DC converter is further configured to float charge the battery in the second mode.

5. The apparatus of claim 1, wherein:
    the first mode comprises a drive mode of a vehicle, and
    the second mode comprises a sleep mode of the vehicle.

6. The apparatus of claim 1, further comprising:
    a controller configured to, in the first mode, control the bi-directional switch to permit the voltage system to provide the second voltage to the battery management system.

7. The apparatus of claim 6, further comprising a switch separate from the bi-directional switch, wherein the controller is configured to, in the second mode, close the switch to permit the DC to DC converter to provide the second voltage to the battery management system.

8. A vehicle, comprising:
    an energy storage system configured to provide a first voltage;
    a direct current (DC) to DC converter;
    a voltage system;
    a battery; and
    a battery management system configured to:
        provide, in a drive mode using the energy storage system separate from the battery, the first voltage to a propulsion component and a second voltage using the voltage system, and
        provide, in a sleep mode using the energy storage system and the DC to DC converter, the second voltage to an electrical component and not to the propulsion component, wherein:
            in the drive mode, the DC to DC converter is in an active state and is configured to provide the first voltage and the second voltage, and
            in the sleep mode, the battery is in an inactive state such that the second voltage is not provided to the electrical component via the battery.

9. The vehicle of claim 8, wherein the battery management system is further configured to, in the drive mode, provide, using the voltage system, the second voltage.

10. The vehicle of claim 9, wherein the battery management system is further configured to, in response to a loss of power from the voltage system, use the energy storage system and the DC to DC converter to provide the second voltage.

11. The vehicle of claim 9, further comprising a conductive pathway electrically coupled to the DC to DC converter, the battery management system and the voltage system, wherein:
    in the drive mode, the voltage system provides, via the conductive pathway, the second voltage to the battery management system, and
    in the sleep mode, the DC to DC converter provides, via the conductive pathway, a float charge to a battery of the voltage system.

12. The vehicle of claim 9, further comprising:
    a bi-directional switch; and
    a controller configured to, in the drive mode, control the bi-directional switch to permit the voltage system to provide the second voltage to the battery management system.

13. The vehicle of claim 12, further comprising a switch, wherein in the sleep mode, the controller is configured to close the switch to permit the DC to DC converter to provide the second voltage to the battery management system.

14. The vehicle of claim 8, wherein: the first voltage comprises an unswitched voltage configured to provide the first voltage, and the DC to DC converter is configured to reduce the unswitched voltage to the second voltage in the sleep mode.

15. A method, comprising:
    providing, from an energy storage system, a first voltage to a propulsion component of an apparatus while the apparatus is in a first mode;
    providing, from a voltage system and via a bi-directional switch, a second voltage to an electrical component while the apparatus is in the first mode, wherein the voltage system is separate from the energy storage system,
    providing, from the energy storage system, the second voltage to the electrical component of the apparatus while the apparatus is in a second mode different from the first mode, wherein the second voltage is lower than the first voltage; and
    receiving, via the bi-directional switch and in the first mode, the second voltage from the voltage system.

16. The method of claim 15, wherein providing the second voltage comprises, providing, from a direct current (DC) to DC converter, the second voltage.

17. The method of claim 16, further comprising, in the first mode, providing the second voltage from a battery separate from the energy storage system.

18. The method of claim 17, further comprising, in the second mode, float charging, using the DC to DC converter, the battery.

19. The vehicle of claim 8, wherein the electrical component comprises one or more of a light or a power seat.

20. The apparatus of claim 1, wherein:
    the first mode comprises a drive mode,
    the second mode comprises a sleep mode, and
    the battery management system is further configured to utilize the DC to DC converter in the drive mode and in the sleep mode.

* * * * *